(12) United States Patent
Patel et al.

(10) Patent No.: US 8,871,830 B2
(45) Date of Patent: Oct. 28, 2014

(54) HIGH-STRENGTH GLUE FORMULATION

(71) Applicants: Yogeshbhai B. Patel, Reynoldsburg, OH (US); Joginder Kukreja, Brooklin, CA (US); Van R. Foster, Columbus, OH (US); Dana L. Conover, Columbus, OH (US)

(72) Inventors: Yogeshbhai B. Patel, Reynoldsburg, OH (US); Joginder Kukreja, Brooklin, CA (US); Van R. Foster, Columbus, OH (US); Dana L. Conover, Columbus, OH (US)

(73) Assignee: Elmer's Products, Inc., Westerville, OH (US)

( * ) Notice: Subject to any disclaimer, the term of this patent is extended or adjusted under 35 U.S.C. 154(b) by 0 days.

(21) Appl. No.: 14/059,075

(22) Filed: Oct. 21, 2013

(65) Prior Publication Data

US 2014/0080939 A1   Mar. 20, 2014

Related U.S. Application Data

(63) Continuation of application No. 12/907,583, filed on Oct. 19, 2010.

(51) Int. Cl.
*C08K 5/05* (2006.01)
*C08K 5/1515* (2006.01)
*C08K 5/103* (2006.01)
*C08K 5/3415* (2006.01)
*C09J 175/04* (2006.01)

(52) U.S. Cl.
CPC ............ *C09J 175/04* (2013.01); *C08G 2170/80* (2013.01)
USPC ............. 523/122; 524/83; 524/114; 524/249; 524/317; 524/386

(58) Field of Classification Search
USPC ............ 523/122; 524/386, 500, 83, 114, 249, 524/317
See application file for complete search history.

(56) References Cited

U.S. PATENT DOCUMENTS

2010/0233146 A1 * 9/2010 McDaniel .................... 424/94.2

OTHER PUBLICATIONS

Lubrizol Advanced Materials, Inc. "Sancure 898 Aliphatic Waterborne Urethane Polymer", Lubrizol Technical Data Sheet, Jun. 4, 2007.*
Lubrizol Advanced Materials, Inc. "Sancure 777 Aliphatic Waterborne Urethane Polymer", Lubrizol Technical Data Sheet, Jun. 4, 2007.*
Eastman, "Product Data Sheet, Eastman Texanol Ester Alcohol", Oct. 14, 2010, pp. 1-3.*
Thor Specialties, Inc. "Thor Products, Biocides", Oct. 14, 2010, pp. 1-2.*
Momentive Performance Materials, "CoatOSil 1770 Silane, Crosslinking Additive for Waterborne Coatings", Mar. 2007.*
Rohm and Haas, "Acrysol RM-825 Rheology Modifier", Sep. 2005.*
Air Products, "Surfynol DF-58 Defoamer", Jan. 2002.*

* cited by examiner

*Primary Examiner* — Kriellion Sanders
(74) *Attorney, Agent, or Firm* — McNees, Wallace & Nurick, LLC

(57) ABSTRACT

A pourable glue formulation is provided. The pourable glue formulation includes a first urethane polymer, wherein the first urethane polymer is operative to provide adequate tensile strength to the formulation; a second urethane polymer, wherein the second urethane polymer is operative to provide adequate flexibility to the formulation; propylene glycol; an ester alcohol; a biocide; a crosslinking agent; a defoamer; and a viscosity modifier.

8 Claims, No Drawings

HIGH-STRENGTH GLUE FORMULATION

CROSS-REFERENCE TO RELATED APPLICATIONS

This patent application is a continuation-in-part of U.S. patent application Ser. No. 12/907,583 filed on Oct. 19, 2010 and entitled "High-Strength Glue Stick Formulation", now abandoned, which claimed the benefit of U.S. Provisional Patent Application Ser. No. 61/252,921 filed on Oct. 19, 2009, and entitled "High Strength Glue Stick", the disclosures of which are hereby incorporated by reference herein in their entirety and made part of the present U.S. utility patent application for all purposes.

BACKGROUND OF THE INVENTION

The described invention relates in general to a glue or adhesive formulation, and more specifically to a two-part polyurethane, pourable glue formulation. Some commercially available glue products such as glue sticks typically include PVP (polyvinylpyrrolidone) or modified-PVOH (polyvinyl alcohol) polymers. These polymers provide such glue products with the strength required to adhere paper items to one another, but lack the adhesive capacity to join other more difficult materials such as wood, metal and plastic. With regard to pourable glue products, current water-based wood glues utilize PVAc (polyvinyl acetate) for adhering wood substrates to one another. When adhesion is required for non-wood substrates, either a two-part epoxy or a one-part polyurethane adhesive is typically used.

Waterborne urethane polymers are sometimes used as a base for products such as waterproof stains or clear shellacs. However, these polymers are not typically used for arts and crafts applications despite the fact that polyurethanes have a greater range of adhesion than many of the polymers used to formulate the glues and adhesives discussed above. Therefore, there is an ongoing need for a high-strength glue formulation for joining wood, metal and plastic, wherein the glue formulation includes waterborne polyurethanes.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a pourable glue formulation is provided. This pourable glue formulation includes a first aliphatic urethane polymer having a viscosity of about 200 cps, a modulus of about 6,000 psi, and a tensile strength of about 7,800 that is operative to form a hard, flexible, clear, high gloss film upon drying, offer stain, chemical and water resistance, and provide elongation at high tensile strength; a second aliphatic urethane polymer, wherein the second urethane polymer has a viscosity of about 75 cps, a modulus of about 1,999 psi, and a tensile strength of about 5,150 that is operative to provide abrasion resistance, high gloss and shear stability, and exhibit adhesion to a wide variety of substrates including nylon and polyester; a freeze-thaw stabilizer, wherein the a freeze-thaw stabilizer is propylene glycol having the formula $C_3H_8O_2$; a film-forming compound, wherein the film-forming compound is an ester alcohol having the formula $C_{12}H_{24}O_3$; a biocide, wherein the biocide is an aqueous blend of chlorinated and non-chlorinated isothiazolinones and 2-bromo-2-nitro-1,3-propanediol; a crosslinking agent, wherein the crosslinking agent is β-(3,4-epoxycyclohexyl) ethyltriethoxysilane; a viscosity modifier, wherein the viscosity modifier is a hydrophobically modified polyethylene oxide urethane; and a defoamer, wherein the defoamer is an organo-modified, silicone-based defoamer.

In accordance with another aspect of the present invention, a pourable glue formulation is provided. This pourable glue formulation includes a first aliphatic urethane polymer having a viscosity of about 200 cps, a modulus of about 6,000 psi, and a tensile strength of about 7,800 that is operative to form a hard, flexible, clear, high gloss film upon drying, offer stain, chemical and water resistance, and provide elongation at high tensile strength; a second aliphatic urethane polymer, wherein the second urethane polymer has a viscosity of about 75 cps, a modulus of about 1,999 psi, and a tensile strength of about 5,150 that is operative to provide abrasion resistance, high gloss and shear stability, and exhibit adhesion to a wide variety of substrates including nylon and polyester; a freeze-thaw stabilizer, wherein the a freeze-thaw stabilizer is propylene glycol having the formula $C_3H_8O_2$; a film-forming compound, wherein the film-forming compound is an ester alcohol having the formula $C_{12}H_{24}O_3$, and wherein the ester alcohol comprises about 0.25% by weight of the total formulation; a biocide, wherein the biocide is an aqueous blend of chlorinated and non-chlorinated isothiazolinones and 2-bromo-2-nitro-1,3-propanediol, and wherein the biocide comprises about 0.1% by weight of the total formulation; a crosslinking agent, wherein the crosslinking agent is β-(3,4-epoxycyclohexyl) ethyltriethoxysilane, and wherein the crosslinking agent comprises about 0.1% by weight of the total formulation; a non-ionic urethane rheology modifier, wherein the non-ionic urethane rheology modifier is a hydrophobically modified polyethylene oxide urethane, wherein the rheology modifier comprises about 0.1% by weight of the total formulation; and a defoamer, wherein the defoamer is an organo-modified, silicone-based defoamer, and wherein the defoamer comprises about 1.5% by weight of the total formulation.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the associated descriptions are to be regarded as illustrative and not restrictive in nature.

DETAILED DESCRIPTION OF THE INVENTION

Exemplary embodiments of the present invention are now described. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates to an adhesive or glue formulation. In an exemplary embodiment of the present invention, a pourable glue formulation is provided. This pourable glue formulation includes a first urethane polymer, wherein the first urethane polymer is operative to provide adequate tensile strength to the formulation; a second urethane polymer, wherein the second urethane polymer is operative to provide adequate flexibility to the formulation; propylene glycol for conferring freeze-thaw stability to the glue formulation; an ester alcohol for conferring film-forming properties to the formulation; a biocide for preventing or at least limiting the growth of microorganisms in the formulation; a crosslinking agent for providing additional final strength to the formulation; a rheology modifier for providing a desirable final viscosity to the formulation; and a defoamer preventing or at least reducing any tendency of the formulation to foam during mixing of the ingredients therein (i.e., during the manufacturing process.

More specifically, in the exemplary embodiment, the first urethane polymer is SANCURE® 898 (Lubrizol) or a similar composition, which is an aliphatic waterborne urethane polymer that forms a very hard, flexible, clear, high gloss film upon drying, offers a high performance coating with very good stain, chemical and water resistance, and that provides good elongation at high tensile strength. This urethane polymer typically has a viscosity of about 200 cps, a modulus of about 6,000 psi, and a tensile strength of about 7,800. The second urethane polymer is SANCURE® 777F (Lubrizol) or a similar composition, which is an aliphatic waterborne urethane polymer that offers very good abrasion resistance, provides high gloss and good shear stability, and that exhibits adhesion to a wide variety of substrates including nylon and polyester. This urethane polymer has a viscosity of about 75 cps, a modulus of about 1,999 psi, and a tensile strength of about 5,150.

Propylene glycol is used to confer freeze-thaw stability to the glue formulation, although other suitable stabilizers known to those of ordinary skill in the art are also compatible with this invention. Propylene glycol is an organic compound (a diol or double alcohol) with the formula $C_3H_8O_2$ and is a colorless, nearly odorless, clear, viscous liquid with a faintly sweet taste that is hygroscopic and miscible with water, acetone, and chloroform. The film-forming compound is an ester alcohol known as TEXANOL (Eastman Chemical Company) having the formula $C_{12}H_{24}O_3$, which is a coalescent for latex paints typically used in the architectural, industrial, and maintenance markets. TEXANOL ester alcohol provides a high level of film integrity at low levels of coalescent. The biocide is ACTICIDE® LA (Thor), which is a combination wet state biocide for water based products that includes an aqueous blend of chlorinated and non-chlorinated isothiazolinones and 2-bromo-2-nitro-1,3-propanediol. These active ingredients provide a wide spectrum of activity against both bacteria and fungi, including species that are difficult to control. This product is particularly effective against pre-existing contamination and is approved for use in craft products by the ACMI (Art & Creative Materials Institute, Inc.). The crosslinking agent is COATOSIL® 1770 silane (Momentive Performance Materials), which is β-(3,4-epoxycyclohexyl) ethyltriethoxysilane, and crosslinks under heat or at room temperature on alkaline substrates and that enhances waterborne coating performance, appearance and handling. The defoamer is SURFYNOL® DF-58 (Air Products), an organo-modified, silicone-based defoamer, which is useful in aqueous systems. It has strong foam control and de-aeration performance in water-based formulations. The viscosity or rheology modifier is ACRYSOL RM-825 (Rohm and Haas), a hydrophobically modified polyethylene oxide urethane, which is a non-ionic, medium shear viscosity builder that can be used as a co-thickener in many types of formulations for attaining a desired balance of low and high shear viscosities.

Having generally described this invention, a further understanding can be obtained by reference to certain specific examples detailed below, which are provided for purposes of illustration only and are not intended to be all inclusive or limiting unless otherwise specified.

EXAMPLE

In an exemplary embodiment of the present invention, the various ingredients described above are present in the following percentages (by weight):

| | |
|---|---|
| SANCURE ® 898 (urethane polymer) | 56.95 |
| SANCURE ® 777F (urethane polymer) | 40.00 |
| Propylene glycol (freeze-thaw stabilizer) | 1.00 |
| TEXANOL ® (ester alcohol) | 0.25 |
| ACTICIDE ® LA (biocide) | 0.10 |
| COTASIL ® 1770 Silane | 0.10 |
| SURFYNOL ® DF-58 (defoamer) | 0.10 |
| ACRYSOL ® RM-825 (rheology modifier) | 1.50 |
| | 100.0 |

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A pourable glue formulation, comprising:
(a) a first aliphatic urethane polymer, wherein the first urethane polymer has a viscosity of about 200 cps, a modulus of about 6,000 psi, and a tensile strength of about 7,800; and wherein the first aliphatic urethane polymer is operative to form a hard, flexible, clear, high gloss film upon drying; offer stain, chemical and water resistance; and provide elongation at high tensile strength;
(b) a second aliphatic urethane polymer, wherein the second urethane polymer has a viscosity of about 75 cps, a modulus of about 1,999 psi, and a tensile strength of about 5,150; and wherein the second aliphatic urethane polymer is operative to provide abrasion resistance; high gloss and shear stability, and exhibit adhesion to a wide variety of substrates including nylon and polyester;
(c) a freeze-thaw stabilizer, wherein the a freeze-thaw stabilizer is propylene glycol having the formula $C_3H_8O_2$;
(d) a film-forming compound, wherein the film-forming compound is an ester alcohol having the formula $C_{12}H_{24}O_3$;
(e) a biocide, wherein the biocide is an aqueous blend of chlorinated and non-chlorinated isothiazolinones and 2-bromo-2-nitro-1,3-propanediol;
(f) a crosslinking agent, wherein the crosslinking agent is β-(3,4-epoxycyclohexyl)ethyltriethoxysilane;
(g) a viscosity modifier, wherein the viscosity modifier is a hydrophobically modified polyethylene oxide urethane; and
(h) a defoamer, wherein the defoamer is an organo-modified, silicone-based defoamer.

2. The formulation of claim 1, wherein the freeze-thaw stabilizer comprises about 1% by weight of the total formulation.

3. The formulation of claim 1, wherein the ester alcohol comprises about 0.25% by weight of the total formulation.

4. The formulation of claim 1, wherein the biocide comprises about 0.1% by weight of the total formulation.

5. The formulation of claim 1, wherein the crosslinking agent comprises about 0.1% by weight of the total formulation.

6. The formulation of claim 1, wherein the viscosity modifier comprises about 0.1% by weight of the total formulation.

7. The formulation of claim 1, wherein the defoamer comprises about 1.5% by weight of the total formulation.

8. A pourable glue formulation, comprising:
(a) a first aliphatic urethane polymer, wherein the first urethane polymer has a viscosity of about 200 cps, a modulus of about 6,000 psi, and a tensile strength of about 7,800; and wherein the first aliphatic urethane polymer is operative to form a hard, flexible, clear, high gloss film upon drying; offer stain, chemical and water resistance; and provide elongation at high tensile strength;
(b) a second aliphatic urethane polymer, wherein the second urethane polymer has a viscosity of about 75 cps, a modulus of about 1,999 psi, and a tensile strength of about 5,150; and wherein the second aliphatic urethane polymer is operative to provide abrasion resistance; high gloss and shear stability, and exhibit adhesion to a wide variety of substrates including nylon and polyester;
(c) a freeze-thaw stabilizer, wherein the a freeze-thaw stabilizer is propylene glycol having the formula $C_3H_8O_2$, and wherein the freeze-thaw stabilizer comprises about 1% by weight of the total formulation;
(d) a film-forming compound, wherein the film-forming compound is an ester alcohol having the formula $C_{12}H_{24}O_3$, and wherein the ester alcohol comprises about 0.25% by weight of the total formulation;
(e) a biocide, wherein the biocide is an aqueous blend of chlorinated and non-chlorinated isothiazolinones and 2-bromo-2-nitro-1,3-propanediol, and wherein the biocide comprises about 0.1% by weight of the total formulation;
(f) a crosslinking agent, wherein the crosslinking agent is β-(3,4-epoxycyclohexyl)ethyltriethoxysilane, and wherein the crosslinking agent comprises about 0.1% by weight of the total formulation;
(g) a non-ionic urethane rheology modifier, wherein the non-ionic urethane rheology modifier is a hydrophobically modified polyethylene oxide urethane, and wherein the rheology modifier comprises about 0.1% by weight of the total formulation; and
(h) a defoamer, wherein the defoamer is an organo-modified, silicone-based defoamer, and wherein the defoamer comprises about 1.5% by weight of the total formulation.

* * * * *